(12) United States Patent
Defossé et al.

(10) Patent No.: US 7,167,892 B2
(45) Date of Patent: Jan. 23, 2007

(54) SYSTEM, METHOD AND APPARATUS FOR VENDING MACHINE WIRELESS AUDIT AND CASHLESS TRANSACTION TRANSPORT

(75) Inventors: Erin M. Defossé, Austin, TX (US); James M. Canter, Austin, TX (US); Bryan W. Godwin, Round Rock, TX (US)

(73) Assignee: Isochron, Inc., Austin, TX (US)

( * ) Notice: Subject to any disclaimer, the term of this patent is extended or adjusted under 35 U.S.C. 154(b) by 0 days.

(21) Appl. No.: 10/722,954

(22) Filed: Nov. 26, 2003

(65) Prior Publication Data

US 2004/0133653 A1 Jul. 8, 2004

Related U.S. Application Data

(63) Continuation-in-part of application No. 09/971,170, filed on Oct. 4, 2001, which is a continuation-in-part of application No. 09/267,254, filed on Mar. 12, 1999, now Pat. No. 6,457,038.

(60) Provisional application No. 60/480,626, filed on Jun. 23, 2003, provisional application No. 60/429,756, filed on Nov. 27, 2002, provisional application No. 60/078,645, filed on Mar. 19, 1998, provisional application No. 60/099,434, filed on Sep. 8, 1998.

(51) Int. Cl.
*G06F 15/16* (2006.01)
(52) U.S. Cl. ........................... 709/200; 700/237
(58) Field of Classification Search ................. 709/200, 709/236; 705/14, 35, 40, 18; 702/188; 713/175; 235/379, 380; 700/237, 78, 224; 70/271
See application file for complete search history.

(56) References Cited

U.S. PATENT DOCUMENTS

| | | | |
|---|---|---|---|
| 3,784,737 A | 1/1974 | Waehner | 178/6 |
| 4,369,442 A | 1/1983 | Werth et al. | |
| 4,412,292 A | 10/1983 | Sedam et al. | 364/479 |
| 4,454,670 A | 6/1984 | Bachmann et al. | 40/584 |
| 4,553,211 A * | 11/1985 | Kawasaki et al. | 700/236 |

(Continued)

FOREIGN PATENT DOCUMENTS

DE 41 40 450 A1 6/1993

(Continued)

OTHER PUBLICATIONS

International Search Report PCT/US 03/37776, Mailed May 17, 2004.

(Continued)

*Primary Examiner*—Andrew Caldwell
*Assistant Examiner*—Stephan Willett
(74) *Attorney, Agent, or Firm*—Baker Botts L.L.P.

(57) ABSTRACT

The present invention provides a system, method and apparatus for collecting, storing and communicating vending machine transaction data. The system preferably includes an embedded data collection and storage device that, when placed inside a vending machine, will collect both DEX and MDB data using a combination of ad-hoc scheduling and trigger-based events. In addition, the embedded data collection and storage device may collect transaction data concerning handheld transactions as well as vending machine error transactions, including timestamps. Functionality operable to permit handheld computer communication with the vending machine, as well as at least a cashless media transaction device may also be included. Data transferred to the handheld computer may be subsequently communicated to one or more host applications or credit agencies.

9 Claims, 3 Drawing Sheets

U.S. PATENT DOCUMENTS

| | | | |
|---|---|---|---|
| 4,661,862 A | 4/1987 | Thompson | 358/335 |
| 4,677,565 A | 6/1987 | Ogaki et al. | 364/479 |
| 4,766,548 A | 8/1988 | Cedrone et al. | 364/479 |
| 4,850,009 A | 7/1989 | Zook et al. | 379/96 |
| 4,926,996 A | 5/1990 | Eglise et al. | |
| 4,954,697 A | 9/1990 | Kokubun et al. | 235/381 |
| 5,029,098 A | 7/1991 | Lavasseur | 364/479 |
| 5,077,582 A | 12/1991 | Kravette et al. | 355/206 |
| 5,090,589 A | 2/1992 | Brandes et al. | 221/2 |
| 5,091,713 A | 2/1992 | Horne et al. | 340/541 |
| 5,117,407 A | 5/1992 | Vogel | 369/30 |
| 5,184,179 A | 2/1993 | Tarr et al. | 355/206 |
| 5,207,784 A | 5/1993 | Schwartzendruber | 221/6 |
| 5,239,480 A | 8/1993 | Huegel | 364/479 |
| 5,255,819 A | 10/1993 | Peckels | 222/1 |
| 5,282,127 A | 1/1994 | Mii | 364/479 |
| 5,323,155 A | 6/1994 | Iyer et al. | 341/51 |
| 5,337,253 A | 8/1994 | Berkovsky et al. | 364/479 |
| 5,339,250 A | 8/1994 | Durbin | 364/479 |
| 5,371,348 A | 12/1994 | Kumar et al. | 235/472 |
| 5,386,360 A | 1/1995 | Wilson et al. | 364/146 |
| 5,400,246 A | 3/1995 | Wilson et al. | 364/146 |
| 5,418,945 A | 5/1995 | Carter et al. | 395/600 |
| 5,445,295 A | 8/1995 | Brown | 221/3 |
| 5,505,349 A | 4/1996 | Peckels | 222/641 |
| 5,507,411 A | 4/1996 | Peckels | 222/1 |
| 5,561,604 A | 10/1996 | Buckley et al. | 364/479.05 |
| 5,608,643 A | 3/1997 | Wichter et al. | 364/479.14 |
| 5,620,079 A | 4/1997 | Molbak | 194/217 |
| 5,649,308 A | 7/1997 | Andrews | 370/334 |
| 5,671,362 A | 9/1997 | Cowe et al. | 395/228 |
| 5,701,252 A | 12/1997 | Facchin et al. | 364/479 |
| 5,708,223 A | 1/1998 | Wyss | 73/865.9 |
| 5,769,269 A | 6/1998 | Peters | 221/7 |
| 5,787,149 A | 7/1998 | Yousefi et al. | 379/59 |
| 5,794,144 A | 8/1998 | Comer et al. | 455/426 |
| 5,805,997 A | 9/1998 | Farris | 455/461 |
| 5,815,652 A | 9/1998 | Ote et al. | 395/183.07 |
| 5,818,603 A | 10/1998 | Motoyama | 358/296 |
| 5,822,216 A | 10/1998 | Satchell, Jr. et al. | 364/479.01 |
| 5,841,866 A | 11/1998 | Bruwer et al. | |
| 5,842,597 A | 12/1998 | Kraus et al. | 221/150 R |
| 5,844,808 A | 12/1998 | Konsmo et al. | 364/479.14 |
| 5,850,187 A | 12/1998 | Carrender et al. | 340/825.54 |
| 5,860,362 A | 1/1999 | Smith | 101/494 |
| 5,862,517 A | 1/1999 | Honey et al. | 702/85 |
| 5,867,688 A | 2/1999 | Simmon et al. | 395/500 |
| 5,892,758 A | 4/1999 | Argyoudis | 370/335 |
| 5,898,904 A | 4/1999 | Wang | 455/31.3 |
| 5,905,442 A | 5/1999 | Mosebrook et al. | 340/825.06 |
| 5,905,882 A | 5/1999 | Sakagami et al. | 395/500 |
| 5,907,491 A | 5/1999 | Canada et al. | 364/468.15 |
| 5,909,183 A | 6/1999 | Borgstahl et al. | 340/825.22 |
| 5,915,207 A | 6/1999 | Dao et al. | 455/9 |
| 5,918,213 A | 6/1999 | Bernard et al. | 705/26 |
| 5,924,081 A | 7/1999 | Ostendorf et al. | 705/30 |
| 5,930,770 A | 7/1999 | Edgar | 705/28 |
| 5,930,771 A | 7/1999 | Stapp | 705/28 |
| 5,941,363 A | 8/1999 | Partyka et al. | 194/217 |
| 5,943,042 A | 8/1999 | Siio | 345/172 |
| 5,949,779 A | 9/1999 | Mostafa et al. | 370/389 |
| 5,950,630 A | 9/1999 | Portwood et al. | 128/897 |
| 5,956,487 A | 9/1999 | Venkatraman et al. | 395/200.48 |
| 5,957,262 A | 9/1999 | Molbak et al. | 194/200 |
| 5,959,536 A | 9/1999 | Chambers et al. | 340/636 |
| 5,959,869 A | 9/1999 | Miller et al. | 364/479.1 |
| 5,982,325 A | 11/1999 | Thornton et al. | 342/357.07 |
| 5,982,652 A | 11/1999 | Simonelli et al. | 363/142 |
| 5,986,219 A | 11/1999 | Carroll et al. | 177/1 |
| 5,991,749 A | 11/1999 | Morrill, Jr. | 705/44 |
| 5,997,170 A | 12/1999 | Brodbeck | 364/479.06 |
| 6,003,070 A | 12/1999 | Frantz | 709/206 |
| 6,005,850 A | 12/1999 | Moura et al. | 370/282 |
| 6,012,041 A | 1/2000 | Brewer et al. | 705/28 |
| 6,021,324 A | 2/2000 | Sizer, II et al. | 455/403 |
| 6,021,437 A | 2/2000 | Chen et al. | 709/224 |
| 6,029,143 A | 2/2000 | Mosher et al. | 705/28 |
| 6,032,202 A | 2/2000 | Lea et al. | 710/8 |
| 6,038,491 A | 3/2000 | McGarry et al. | 700/231 |
| 6,052,667 A | 4/2000 | Walker et al. | 705/15 |
| 6,052,750 A | 4/2000 | Lea | 710/72 |
| 6,056,194 A | 5/2000 | Kolls | 235/381 |
| 6,057,758 A | 5/2000 | Dempsey et al. | 340/539 |
| 6,061,668 A | 5/2000 | Sharrow | 705/400 |
| 6,068,305 A * | 5/2000 | Myers et al. | 292/201 |
| 6,070,070 A | 5/2000 | Ladue | 455/419 |
| 6,072,521 A | 6/2000 | Harrison et al. | 348/12 |
| 6,085,888 A | 7/2000 | Tedesco et al. | 194/217 |
| 6,119,100 A | 9/2000 | Walker et al. | 705/20 |
| 6,131,399 A | 10/2000 | Hall | 62/127 |
| 6,161,059 A | 12/2000 | Tedesco et al. | 700/232 |
| 6,163,811 A | 12/2000 | Porter | 709/247 |
| 6,181,981 B1 | 1/2001 | Varga et al. | 700/236 |
| 6,185,545 B1 * | 2/2001 | Resnick et al. | 705/40 |
| 6,230,150 B1 | 5/2001 | Walker et al. | 705/400 |
| 6,272,395 B1 | 8/2001 | Brodbeck | 700/236 |
| 6,289,453 B1 * | 9/2001 | Walker et al. | 713/175 |
| 6,304,895 B1 | 10/2001 | Schneider et al. | 709/203 |
| 6,324,520 B1 | 11/2001 | Walker et al. | 705/16 |
| 6,339,731 B1 * | 1/2002 | Morris et al. | 700/236 |
| 6,341,271 B1 | 1/2002 | Salvo et al. | 705/28 |
| 6,356,794 B1 * | 3/2002 | Perin et al. | 700/78 |
| 6,385,772 B1 | 5/2002 | Courtney | 725/105 |
| 6,434,534 B1 | 8/2002 | Walker et al. | 706/14 |
| 6,437,692 B1 | 8/2002 | Petite et al. | 340/540 |
| 6,442,532 B1 * | 8/2002 | Kawan | 705/35 |
| 6,457,038 B1 * | 9/2002 | Defosse | 709/200 |
| 6,462,644 B1 | 10/2002 | Howell et al. | 340/5.92 |
| 6,467,685 B1 * | 10/2002 | Teicher | 235/379 |
| 6,502,131 B1 | 12/2002 | Vaid et al. | 709/224 |
| 6,505,095 B1 * | 1/2003 | Kolls | 700/244 |
| 6,525,644 B1 | 2/2003 | Stillwagon | |
| 6,553,336 B1 * | 4/2003 | Johnson et al. | 702/188 |
| 6,581,986 B1 * | 6/2003 | Roatis et al. | 292/199 |
| 6,584,309 B1 | 6/2003 | Whigham | 455/414 |
| 6,604,086 B1 * | 8/2003 | Kolls | 705/14 |
| 6,604,087 B1 | 8/2003 | Kolls | 705/14 |
| 6,606,602 B1 | 8/2003 | Kolls | 705/14 |
| 6,606,605 B1 | 8/2003 | Kolls | 705/26 |
| 6,609,113 B1 * | 8/2003 | O'Leary et al. | 705/39 |
| 6,615,623 B1 | 9/2003 | Ormerod | 70/224 |
| 6,695,166 B1 | 2/2004 | Long | 221/14 |
| 6,704,714 B1 * | 3/2004 | O'Leary et al. | 705/39 |
| 6,712,266 B1 * | 3/2004 | Bartley et al. | 235/380 |
| 6,714,977 B1 | 3/2004 | Fowler et al. | 709/224 |
| 6,735,630 B1 | 5/2004 | Gelvin et al. | 709/224 |
| 6,738,811 B1 | 5/2004 | Liang | 709/224 |
| 6,748,296 B1 | 6/2004 | Banerjee et al. | 700/241 |
| 6,751,562 B1 | 6/2004 | Blackett et al. | 702/61 |
| 6,754,558 B1 | 6/2004 | Preston et al. | 700/236 |
| 6,772,048 B1 | 8/2004 | Leibu et al. | 700/241 |
| 6,826,607 B1 | 11/2004 | Gelvin et al. | 709/224 |
| 6,832,251 B1 | 12/2004 | Gelvin et al. | 709/224 |
| 6,844,813 B1 | 1/2005 | Hardman | 340/539.1 |
| 6,850,252 B1 | 2/2005 | Hoffberg | 315/716 |
| 6,859,831 B1 | 2/2005 | Gelvin et al. | 709/224 |
| 6,867,685 B1 | 3/2005 | Stillwagon | |
| 6,876,988 B1 | 4/2005 | Helsper et al. | 706/21 |
| 6,900,720 B1 | 5/2005 | Denison et al. | |
| 6,959,265 B1 | 10/2005 | Candela et al. | 702/186 |
| 6,973,475 B1 | 12/2005 | Kenyon et al. | 709/203 |
| 2001/0002210 A1 | 5/2001 | Petite | 379/155 |
| 2002/0024420 A1 | 2/2002 | Ayala et al. | |
| 2002/0169539 A1 | 11/2002 | Menard et al. | 701/200 |

| 2003/0013482 | A1 | 1/2003 | Brankovic | 455/553 |
| 2003/0128101 | A1 | 7/2003 | Long | |
| 2004/0207509 | A1 | 10/2004 | Miynarczyk et al. | 340/5.23 |
| 2005/0161953 | A1 | 7/2005 | Roatis et al. | 292/199 |
| 2005/0179544 | A1 | 8/2005 | Sutton et al. | 340/543 |

FOREIGN PATENT DOCUMENTS

| EP | 0 564 736 A1 | 10/1993 |
| EP | 0 602 787 A2 | 10/1993 |
| EP | 0 817 138 A1 | 1/1998 |
| EP | 0 999 529 | 5/2000 |
| EP | 1096408 | 5/2001 |
| FR | 2 744 545 | 2/1996 |
| FR | 2 755776 | 5/1998 |
| JP | 6296335 A2 | 10/1994 |
| JP | 9198172 A2 | 7/1997 |
| WO | WO 89/07807 | 8/1989 |
| WO | WO 95/04333 | 2/1995 |
| WO | WO 95/05609 | 2/1995 |
| WO | WO 97/09667 | 3/1997 |
| WO | WO 98/45779 | 10/1998 |
| WO | WO 99/23620 | 5/1999 |
| WO | WO 99/27465 | 6/1999 |
| WO | WO 99/36751 | 7/1999 |
| WO | WO 99/48065 | 9/1999 |
| WO | WO 00/04475 | 1/2000 |
| WO | WO 00/04476 | 1/2000 |
| WO | WO 00/31701 | 6/2000 |
| WO | 02/19281 | 3/2002 |

OTHER PUBLICATIONS

International PCT Preliminary Examination Report PCT/US01/31381, Mailed May 12, 2003.

International Search Report for PCT/US99/05983 7 pages (064814.0107), Mailed Aug. 13, 1999.

International Search Report PCT US 01/41640, Mailed Aug. 21, 2002.

International Search Report PCT/US 01/31381 (064814.0209), Mailed Nov. 7, 2002.

International Search Report PCT/US01/15522, Mailed May 16, 2002.

International Search Report PCT/US01/16749 (064814.0145), Dec. 20, 2001.

American Power Conversion Internet Article, "Lightning Advisor", at internet ,<http://lightning.apcc.com>, Printed May 10, 2000.

American Products Internet Article, "Product Information", at internet, <http://www.apc.com>, Printed May 10, 2000.

Left high and dry? Sold-out machine sends for Cokes; Nashville Banner, Aug. 16, 1995.

Leitch, Carolyn, "Coke machines signal when it's time for a refill"; The Globe & Mail, Toronto, Ontario, Aug. 30, 1995.

Meet the Smart Coke Machine; The Sacramento Bee Business Technology; Wednesday, Aug. 30, 1995.

NetBotz Internet Article, "Welcome to Netbotz" at internet <http:www.netbotz.com>, Printed May 10, 2000.

Skywire allows vendor tracking of pop stock and sales details; RCR, vol. 14, No. 17, Sep. 4, 1995.

Skywire Provides Details of Wireless 'VendView' System; Vending Times, Sep. 1994.

Wireless Communications Forum; vol. III, No. 1 pp. 25-30, Apr. 1995.

Pending U.S. Appl. No. 09/853,366, entitled *Method and System for the Optimal Formatting, Reduction and Compression of DEX/UCS Data* filed May 11, 2001 by Defosse et al.

Pending U.S. Appl. No. 09/862,891, entitled *System and Apparatus for the Remote Monitoring and Control of a Computing Component*—filed May 22, 2001 by Erin M. Defosse.

Pending U.S. Appl. No. 09/899,527, entitled *Real-Time Alert Mechanism for Monitoring and Controlling Field Assets Via Wireless and Internet Technologies* filed Jul. 5, 2001 by May et al.

Pending U.S. Appl. No. 09/923,046, entitled *System and Method for Monitoring and Control of Beverage Dispensing Equipment* filed Aug. 6, 2001 by Erin M. Defosse.

Pending U.S. Appl. No. 09/971,170, entitled *Remote Data Acquisition, Transmission and Analysis System Including Handheld Wireless Equipment* filed Oct. 4, 2001 by Defosse.

Pending U.S. Appl. No. 09/895,647, entitled *Method and System for Interfacing a Machine Controller and a Wireless Network* filed Jun. 29, 2001 by Defosse et al.

Pending U.S. Appl. No. 10/304,603, entitled *Method and System for Scheduling the Maintenance of Remotely Monitored Devices* filed Nov. 26, 2002 by Godwin.

Pending U.S. Appl. No. 10/304,611, entitled *Method and System for Predicting the Service Needs of Remote Point of Sale Devices* filed Nov. 26, 2002 by Godwin.

Pending U.S. Appl. No. 10/426,840; entitled *Method and System for Interpreting Information Communicated by Disparate Dialects* filed Apr. 30, 2003 by May et al.

Pending U.S. Appl. No. 10/330,366, entitled *Method and System for the Efficient Communication of Data with and between Remote Computing Devices* filed Dec. 27, 2002 by Defosee et al.

Pending U.S. Appl. No. 10/208,221, entitled *Remote Data Acquisition and Transmission System and Method* filed Jul. 30, 2002 by Erin M. Defosse.

Maxim/Dallas, "What is an iButton?" at internet http://www.maxim-ic.com/products/ibutton/ibuttons/, 3 pages, Printed Dec. 29, 2005.

\* cited by examiner

SYSTEM, METHOD AND APPARATUS FOR VENDING MACHINE WIRELESS AUDIT AND CASHLESS TRANSACTION TRANSPORT

RELATED PATENT APPLICATION

This application claims the benefit of U.S. provisional application No. 60/429,756 entitled "System and Method for Wireless Audit and Cashless Transaction Transport" filed Nov. 27, 2002 by Erin M. Defossé and claims the benefit of U.S. provisional application No. 60/480,626 entitled "System and Method for Auditing a Vending Machine" filed Jun. 23, 2003 by Erin M. Defossé and is a continuation-in-part of U.S. patent application Ser. No. 09/971,170 filed on Oct. 4, 2001 by Erin M. Defossé and entitled "Remote Data Acquisition, Transmission and Analysis System Including Handheld Wireless Equipment," which is a continuation-in-part of U.S. patent application Ser. No. 09/267,254 filed on Mar. 12, 1999 by Erin M. Defossé and entitled "Wide Area Network Operation's Center that Sends and Receives Data from Vending Machines," now U.S. Pat. No. 6,457,038 that claims priority to U.S. Provisional Patent Application Ser. No. 60/078,645, filed Mar. 19, 1998, and entitled "Remote Data Acquisition and Transmission System for the Monitoring and Control of Vending Machines," and U.S. Provisional Patent Application Ser. No. 60/099,434, filed Sep. 8, 1998, and entitled "Remote Data Acquisition and Transmission System."

TECHNICAL FIELD OF THE INVENTION

The present invention relates generally to vending machines and, more particularly, to vending system management and transaction reporting.

BACKGROUND OF THE INVENTION

The availability of new technologies has given vending machine manufacturers and software developers many tools to address market demands of vending operators. Advances in software and electronics are now enabling the use of computer controls and data acquisition systems directly inside a vending machine. Some of the latest vending machines now make it possible for vending machine operators to download selected aspects of operational information on-site onto portable computers. Although these computerized systems make it easier for operators to gather and analyze some data, they generally ignore many significant aspects of vending operations and commonly provide untimely data. In addition, these computerized systems are typically cumbersome, difficult to connect and fail to leverage advanced functionality likely to enhance vending machine operation efficiency and profitability.

SUMMARY OF THE INVENTION

In one aspect, the present invention provides a system for auditing a vending machine. In a preferred embodiment, the system includes an audit device mounted in a vending machine. The audit device preferably includes a multi-drop-bus (MDB) for communicating with a (MDB) interface of a vending machine controller (VMC) and a DEX interface for communicating with a DEX interface of the vending machine controller. The system preferably also includes a computer interface in the audit device for communicating with a handheld computer. The audit device of the system preferably further includes a clock and clock control logic for automatically synchronizing the clock and the audit device with a clock in the handheld computer. Nonvolatile memory is preferably included in the audit device for storing DEX data and MDB data. Audit control logic is preferably also included and operable to automatically collect DEX data and MDB data from the VMC. The audit control logic preferably further stores timestamps with the DEX and MDB data to record current times for individual events and conditions within the vending machine. The audit device preferably further includes authentication control logic for preventing unauthorized communications over the computer interface and transfer control logic for transferring collected DEX data and MDB data from the audit device to the handheld computer.

In a further embodiment, a method for auditing a vending machine is provided. The method preferably includes the operations of automatically collecting audit data in an audit device mounted in a vending machine according to predefined collection criteria. In addition, the method preferably provides for storing the audit data with associated timestamps to record occurrence times for individual events and conditions within the vending machine. Continuing, the method preferably includes receiving authentication information from a handheld computer at the audit device and in response to the authentication information, testing the authentication information for validity. In response to receiving valid authentication data, the method preferably provides for synchronizing a clock in the audit device with a clock in the handheld computer and transferring at least a portion of the audit data to the handheld computer. Further, the method preferably provides for transmitting the audit data from the handheld computer to a host application on a central computer for analysis.

In a further embodiment, teachings of the present invention provide an apparatus for collecting, storing and communicating vending machine data. In a preferred embodiment, the apparatus preferably includes at least one processor, at least one memory operably coupled to the processor and at least one communication port operably coupled to the processor and the memory. In a preferred embodiment, the communication port is preferably operable to communicate vending machine transaction data including cashless transaction data obtained from a cashless media device to a handheld computer.

In still another embodiment, teachings of the present invention provide a method for communicating with a vending machine. The method preferably includes transmitting information from a handheld computer to a vending machine via a wireless communications interface in the vending machine operating substantially in accordance with at least one unlicensed radio band. The method preferably further includes receiving information at the handheld computer from the vending machine via a wireless communications interface in the handheld computer operating substantially in accordance with at least one unlicensed radio band.

In a still further embodiment, teachings of the present invention provide a vending machine including vending hardware, a vending machine controller, and an electronically controllable lock. The vending machine preferably also includes an audit device having a communications interface in communication with the electronically controllable lock. In a preferred embodiment, the audit device is preferably operable to receive an unlock command from a handheld computer via the communications interface and to unlock the vending machine in response to receiving the unlock command.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments and their advantages are best understood by reference to FIGS. 1 through 5, wherein like numbers are used to indicate like and corresponding parts.

Figure 1:
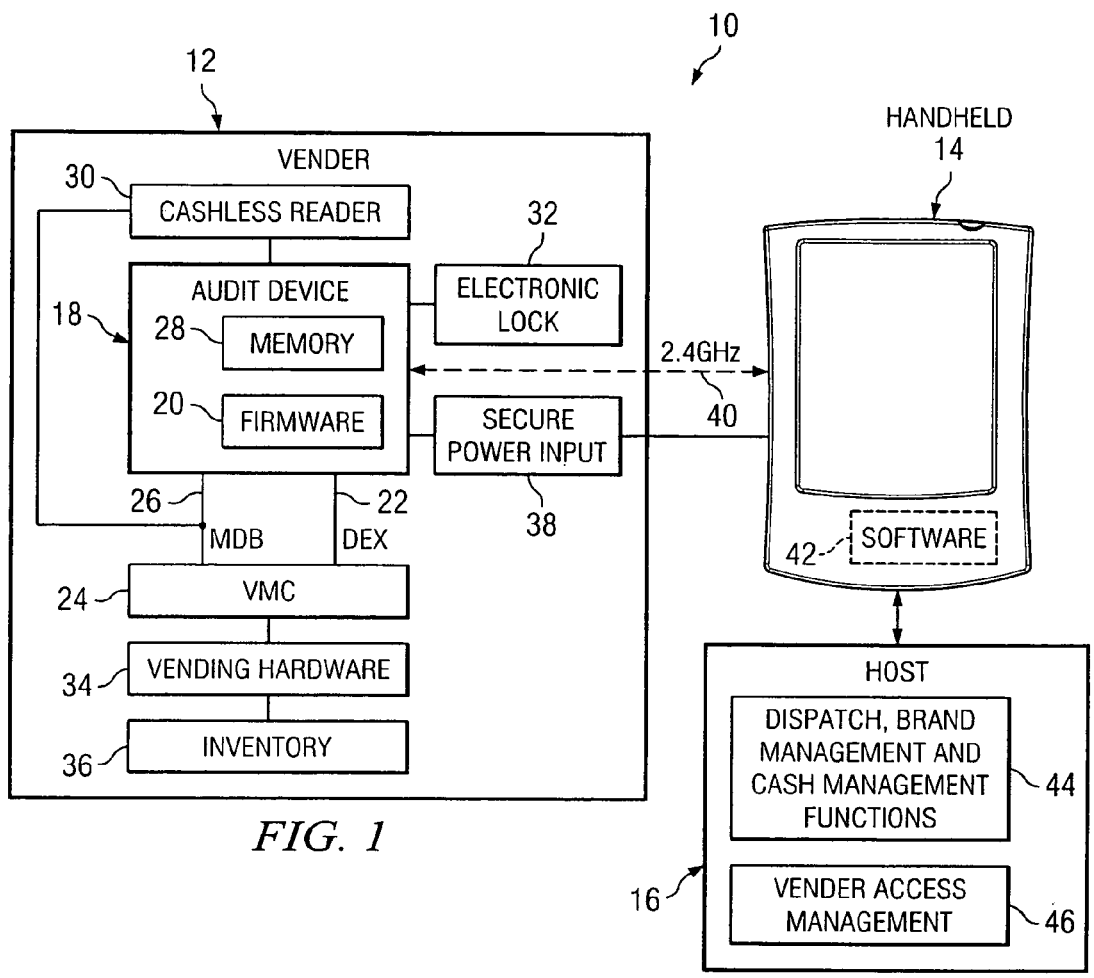
FIG. 1 is a block diagram depicting one embodiment of a vending machine transaction data collection, storage and communication system according to teachings of the present invention.

Referring first to FIG. 1, a block diagram depicting one embodiment of a vending machine transaction data collection, storage and communication system incorporating teachings of the present invention is shown. As illustrated in FIG. 1, system 10 preferably includes vendor or vending machine 12, handheld computing device or apparatus 14 and host application service provider 16.

As depicted in FIG. 1, vending machine 12 preferably includes at least one embedded processing apparatus or audit device 18 having firmware 20. Among other operations, audit device 18 is preferably operable to obtain DEX data via DEX interface or communication link 22 from vending machine controller (VMC) 24 preferably included in vending machine 12. In addition to DEX data, audit device 18 is preferably further operable to obtain multi-drop-bus (MDB) data via MDB interface or communication link 26 generated by VMC 24 and one or more payment peripherals preferably included on vending machine 12. Once DEX data and MDB data have been obtained from VMC 24 by audit device 18, the DEX and MDB data may be archived in vending machine memory 28.

Vending machine 12 preferably also includes one or more hardware devices to facilitate the acceptance of cash and/or non-cash payment tokens. One example of a non-cash payment token hardware device is illustrated in vending machine 12 at 30. Cashless reader or media device 30 is preferably coupled to audit device 18 and VMC 24 via MDB interface 26. As suggested, cashless media device or reader 30 is preferably designed to enable vending machine 12 acceptance of non-cash payment tokens such as credit cards, RFID (radio frequency identification devices), or other media representative of non-cash payment functionality.

Vending machine 12 preferably further includes electronic lock 32. In one embodiment, electronic lock 32 is coupled to audit device 18. In operation, audit device 18 is preferably configured such that electronic lock 32 may be commanded to engage and disengage. Audit device 18 may operate electronic lock 32 by supplying appropriate power and, optionally, a digital control signal.

Vending machine 12 preferably also includes vending hardware 34 and inventory 36. Among other items, vending hardware 34 may include one or more inventory dispensing apparatuses, one or more coin acceptance and verification mechanisms, one or more bill acceptance and validation mechanisms, as well as other devices.

Vending machine 12 may also include secure power input 38 operably coupled to audit device 18. In one embodiment, secure power input 38 may be included to facilitate the provision of power to audit device 18 in the event of vending machine 12 power failure, or in other circumstances. Secure power input 38 preferably includes an interface including a contact point externally available on vending machine 12 together with one or more suppression and power conditioning hardware devices operable to guard against attack. As illustrated in FIG. 1, secure power input 38 may connect with handheld computing apparatus 14 such that audit device 18 may be powered by handheld computing apparatus 14.

In a preferred embodiment, handheld computing apparatus 14 is preferably operable to communicate with audit device 18 using, at least, wireless communications 40. To enable wireless communications 40, handheld computing apparatus 14 and audit device 18 are preferably each equipped with one or more wireless transceivers. Examples of wireless communications that may be utilized between handheld computing apparatus 14 and audit device 18 include, but are not limited to, Bluetooth, IEEE 802.11a, IEEE 802.11b and IEEE 802.11g According to teachings of the present invention, wireless communications may be effected over one or more of the unlicensed radio bands. At present, the unlicensed radio bands include at least the 900 Megahertz, 2.4 Gigahertz and 5 Gigahertz radio bands. Future unlicensed radio bands as well as future licensed radio bands may be implemented in accordance with teachings of the present invention. In addition, other radio bands are considered within the spirit and scope of the teachings disclosed herein.

In operation, when a handheld computing apparatus 14 interfaces with audit device 18 over Bluetooth wireless communications capability 40, data such as DEX data and MDB data archived in memory 28 may be transferred on demand to handheld computing apparatus 14. In addition, handheld computing apparatus 14, leveraging one or more aspects of software 42, may send a command to audit device 18 requesting access to vending machine 12 such that audit device 18, in response thereto, may disengage electronic lock 32 such that access to internal components of vending machine 12 may be had.

In addition to DEX data and MDB data, audit device 18 may be configured to record and store other transactions with or activities of vending machine 12. For example, audit device 18 may be configured to store a log associated with vending machine 12 recording such transactions as the frequency, occurrence times and responsible handheld computing apparatus 14 requesting disengagement of electronic lock 32. In addition, audit device 18 may be configured to log vending machine 12 errors such as compressor failure, vend failures, inventory depletion, correct change events, user selected events, as well as myriad other vending machine activities or transactions. As with DEX data and MDB data, an audit log or trail maintained by audit device 18 may also be communicated or downloaded to handheld computing apparatus 14 via Bluetooth wireless communications 40 operating at approximately the 2.4 GHz radio spectrum.

Handheld computing apparatus 14 may also be employed as a proxy or go-between for vending machine 12 and host application service provider 16. In one embodiment, handheld computing apparatus 14 may be used to communicate MDB data, DEX data 22 as well as one or more aspects of an audit trail or log maintained by audit device 18 from vending machine 12 to host application service provider 16. Host application service provider 16 may use and collect such data for purposes including, but not limited to, dispatch, brand management and cash management functions 44 as well as vender access management functions 46. In addition, handheld computing apparatus 14 may be operable to permit transaction records associated with cashless media device or reader 30 to be communicated from vending machine 12 such that accounts associated with such cashless transactions and the agencies responsible for the associated accounts may be contacted to initiate collection procedures. Handheld computing apparatus 14 may communicate with host application service provider 16 in a variety of manners, including, but not limited to, wireless and/or wireline communication mediums. Greater detail regarding the cooperation of vending machine 12, handheld computing apparatus 14 and host application service provider 16 will be discussed below.

Figure 2:
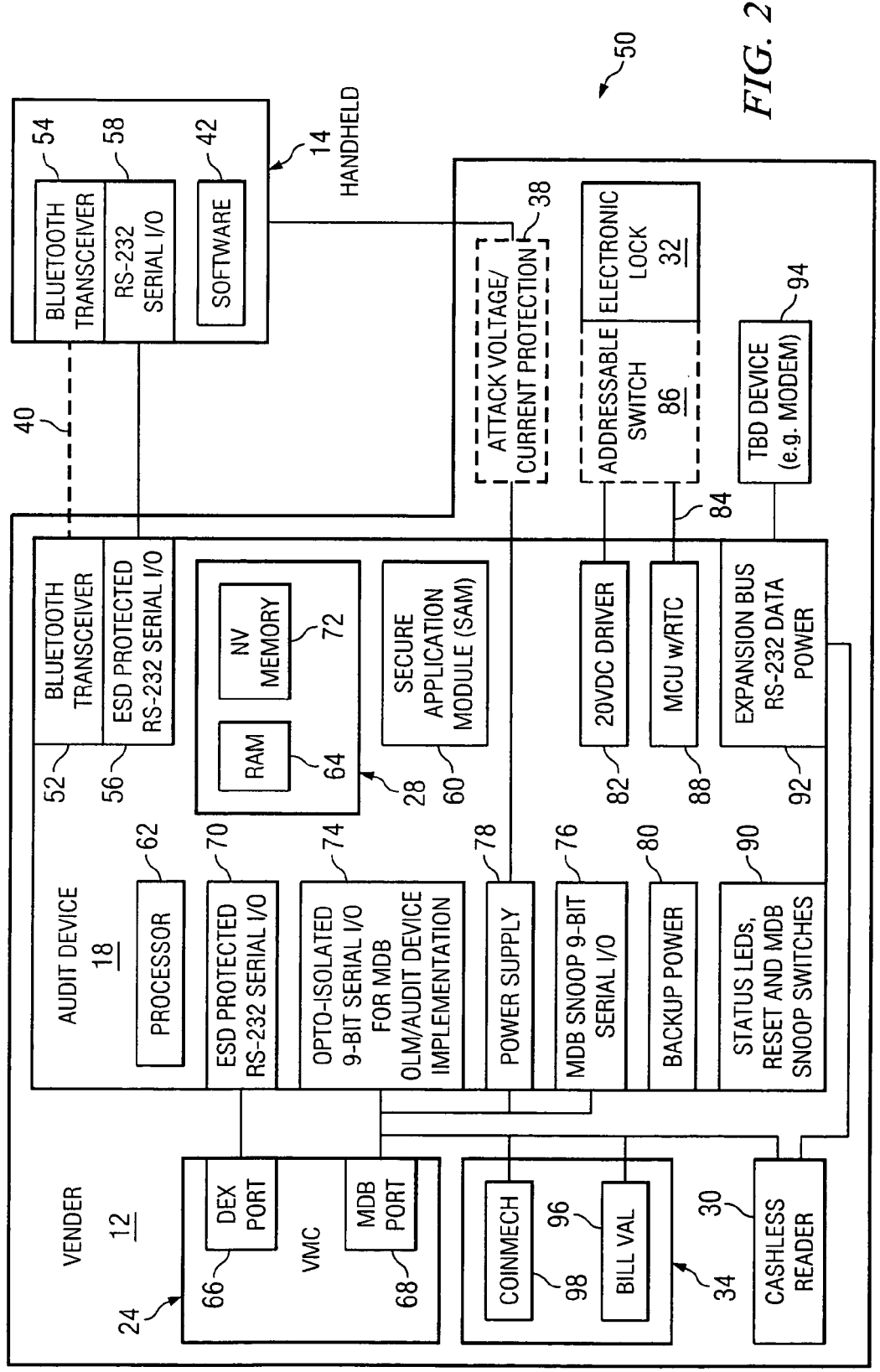
FIG. 2 is a block diagram depicting portions of the system illustrated generally in FIG. 1 in greater detail according to teachings of the present invention.

In order to implement teachings of the present invention, audit device 18 preferably supports a variety of interfaces and internal subsystems. Referring to FIG. 2, a diagram illustrating one embodiment of preferred hardware elements for the implementation of such interfaces and subsystems is shown.

Illustrated generally at 50 is one embodiment of a communicative coupling between vending machine 12 and handheld computing apparatus 14. As mentioned above, vending machine 12 and handheld computing apparatus 14 may communicate wirelessly, such as via Bluetooth wireless communications 40, in one embodiment. To enable vending machine 12 to communicate wirelessly with handheld computing apparatus 14, audit device 18 of vending machine 12 preferably includes Bluetooth transceiver 52 and handheld computing apparatus 14 preferably includes Bluetooth transceiver 54. In part for purposes of fail-over or redundancy, vending machine 12 and handheld computing apparatus may include wired or wireline communication connection capabilities 56 and 58, respectively. In one embodiment, wired or wireline communication capabilities 56 and 58 may be implemented as ESD (electrostatic sensitive device) protected RS-232 serial I/O (input/output) communication ports. Alternative technology selections for the wireless and wireline communications between vending machine 12 and handheld computing apparatus 14 may be chosen without departing from the spirit and scope of teaching of the present invention.

The wireless and/or wireline communication capabilities of vending machine 12 and handheld computing apparatus 14 preferably enable the creation of a personal area network (PAN) between vending machine 12 and handheld computing apparatus 14. Creation of a PAN preferably provides a mechanism for getting and setting data to and from audit device 18 of vending machine 12 using handheld computing apparatus 14.

From a software perspective, a PAN between vending machine 12 and handheld computing apparatus 14 may be implemented in a master-slave configuration. In such a configuration, handheld computing apparatus 14 preferably serves the role as master while audit device 18 of vending machine 12 preferably serves the role of slave. To allow handheld computing apparatus 14 to get and set data to and from audit device 18 of vending machine 12, a command response protocol may be implemented on the PAN.

The PAN created between vending machine 12 and handheld computing apparatus 14 will preferably also implement one or more security features. Such security features may include security components of the Bluetooth communication standard or in lieu of such security features. Preferably included among the security features of a PAN are device personal identification numbers (PIN) and data encryption. In the event of the use of or inclusion of one or more RS-232 and/or IrDA (Infrared Data Association) interfaces, security features implemented by the PAN may be limited to an access password given that RS-232 and IrDA interfaces themselves are typically secure by virtue of the fact that they are located within vending machine 12.

As an aid to the security features implemented in a PAN between vending machine 12 and handheld computing apparatus 14, audit device 18 preferably includes a secure application module (SAM) 60. SAM 60 is preferably provided in hardware to securely store one or more encryption keys necessary to implement a preferred security model. In one embodiment, SAM 60 may be implemented in the form of a secure microprocessor. In an alternate embodiment, SAM 60 may be implemented in a EEPROM (electronically erasable programmable read-only memory) device.

A processor subsystem is preferably included in audit device 18 to control some or all of the operations preferred of it. In one embodiment, processor subsystem of audit device 18 preferably includes one or more embedded microprocessors 62. Preferably associated with the one or more microprocessors 62 of the processor subsystem is one or more random access memory (RAM) devices 64. In operation, the one or more microprocessors 62 preferably cooperate with the one or more RAM devices 64 to drive selected software and hardware functionality of audit device 18.

To enable audit device 18 to obtain DEX data as well as MDB data, VMC 24 preferably includes at least one DEX port 66 and at least one MDB port 68. In one embodiment, audit device 18 preferably includes DEX interface 70 implemented as an RS-232 serial data I/O interface. DEX interface 70 of audit device 18 preferably enables audit device 18 to obtain DEX data from VMC 24.

In a preferred embodiment, DEX interface 70, preferably provides ESD protection. In addition, DEX interface 70 is preferably operable to communicate with master, slave and slave-read-only VMCs. In hardware, DEX interface 70 is preferably operable to enter and exit a high-impedance mode such that one or more VMCs attempting to detect devices connected on their respective VMC ports cannot detect audit device 18 when not in a data collection mode.

In operation, audit device 18 preferably leverages DEX interface 70 with DEX port 66 of VMC 24 to perform DEX data fetching at predefined scheduled intervals or on command, such as from handheld computing apparatus 14. In addition, audit device 18 may archive DEX data obtained via DEX interface 70 from DEX port 66 of the VMC 24 in memory system 28 of audit device 18, in either RAM 64 or non-volatile memory 72.

To communicate with MDB port 68 of VMC 24, audit device 18 preferably includes an MDB interface. In one embodiment, the MDB interface of audit device 18 preferably includes opto-isolated serial I/O interface 74 and MDB-snoop serial I/O 76. As such, the MDB interface of audit device 18 is preferably a serial data I/O interface operable to obtain atomic level sales transactions data as well as payment peripheral status data including, but not limited to, error codes and aborted sales transactions. The MDB interface of audit device 18 is preferably enabled to operate in at least three modes, including MDB-snoop, MDB Comms gateway and MDB audit device.

As mentioned above, MDB interface of audit device 18 preferably includes opto-isolated serial I/O 74. Opto-isolated serial I/O 74, or an equivalent design, preferably provides high transient protection for audit device 18.

To facilitate reading and writing data over MDB interface or communication link 26, audit device 18 may implement nine-bit serial data communications via opto-isolated serial I/O 74 and MDB-snoop serial I/O 76. To guard against unexpected incompatibilities with MDB-snoop, audit device 18 is preferably operable to implement the ability to turn MDB-snoop on and off in hardware and/or software level switches.

As mentioned above, audit device 18 preferably includes memory 28. In one embodiment, memory 28 preferably acts as a data storage subsystem providing non-volatile storage for data obtained by audit device 18. Such data may include, but is not limited to, DEX data, MDB data, as well as data obtained from one or more handheld computing apparatus 14 interfaces. For example, non-volatile memory 72 of memory system 28 may store DEX files, MDB peripheral status files, audit device configuration files, POC data, etc.

Also preferably included in audit device 18, is a real-time-clock or timing subsystem (not expressly shown). Audit device 18 preferably includes a timing subsystem or real-time-clock synchronized to a reference standard such that audit device 18 may timestamp one or more aspects of archived data.

For the provision of power, audit device 18 preferably also includes a power subsystem. Power subsystem of audit device 18 may include power supply 78 and backup power 80. The power subsystem is preferably responsible for providing operational power to one or more electronics of audit device 18. In one embodiment, power to drive the operation of audit device 18 may be obtained via the MDB interface. In such an embodiment, appropriate power regulation and surge suppression is preferably provided in order to protect audit device 18 from transient fluctuations that may occur on the MDB communication link or interface.

Compatibility of vending machine 12 and audit device 18 with electromechanical vendors may be provided through an external power converter/conditioner operable to take one-hundred ten (110) volt AC and/or DC or AC power from a vendor's peripheral bus and convert it to twenty-four (24) volts DC. A six-pin MDB connector may also be provided on the external power converter to allow audit device 18 to connect and draw power therefrom.

As mentioned above, circumstances may arise in which vending machine 12 is without power. In an effort to deal with power failures on vending machine 12, an optional power interface, such as secure power input 38, may be included to provide power to audit device 18 from handheld computing apparatus 14. In certain circumstances, handheld computing device 14 may provide power via secure power input 38 to audit device 18 such that electronic lock 32 may be engaged or disengaged as requested from handheld computing apparatus 14. As mentioned above, secure power input 38 preferably includes a contact point externally available on vending machine 12 together with one or more surge suppression and power conditioning hardware devices operable to guard against vending machine 12 attacks. Alternative arrangements of a power subsystem for audit device 18 and/or vending machine 12 may be implemented without departing from the spirit and scope of teachings of the present invention.

Electronic lock 32 is preferably included in vending machine 12 and operably coupled to audit device 18. As mentioned above, handheld computing apparatus 14 may direct audit device 18 to engage or disengage electronic lock 32. To enable such functionality, audit device preferably includes an electronic lock interface which facilitates audit device 18 response to a handheld computing apparatus 14 request to command electronic lock 32 on vending machine 12 to open or close. In a preferred embodiment, the electronic lock interface of audit device 18 may be implemented using a four-wire interface connecting twenty (20) volt DC driver 82, a power ground line (not expressly shown), a digital data line 84 and a data ground line (not expressly shown). Digital data line 84 is preferably used to command electronic lock 32 to engage and disengage, as required.

In a preferred embodiment, digital data line 84 preferably couples a one-wire addressable switch 86 associated with electronic lock 32 with mechanical control unit 88 having a real-time-clock included therein. In a preferred embodiment, addressable switch 86 is preferably addressable using a unique forty-eight bit (48-bit) key. To command electronic lock 32, audit device 18 will preferably address switch 86 using a correct forty-eight-bit key. Failure to provide a correct key may result in commands issued by audit device 18 to electronic lock 32 to be ignored.

To provide operational status feedback to a user, audit device 18 preferably includes user interface subsystem 90. In one embodiment, user interface subsystem 90 may include one or more light emitting diodes (LED) operable to communicate operational status feedback as to one or more aspects of audit device 18 and/or vending machine 12. User interface subsystem 90 may also include a reset button and a MDB-snoop on/off switch. According to teachings of the present invention, a secondary user interface subsystem may be made available, such as via software 42, through handheld computing apparatus 14. Additional detail regarding user interface subsystem 90 will be discussed in greater detail below.

Expansion bus 92 may be included in audit device 18 to provide a means for audit device 18 to interface with other hardware available on vending machine 12, or otherwise. For example, expansion bus 92 may enable audit device 18 to communicate with one or more cashless media devices or readers 30 included on vending machine 12. Expansion bus 92 may also enable audit device 18 to communicate with a wireless wide area network (WWAN) radio transceiver, a wireless local area network (WLAN) transceiver or other vending machine 12 expansion hardware 94.

In a preferred embodiment, expansion bus 92 may be implemented as an RS-232 serial I/O data bus. In addition to providing communication capabilities, expansion bus 92 may also be operable to provide output power sufficient to drive one or more expansion devices 94. In a further embodiment, expansion bus 92 may be configured to accommodate a plurality of physical RS-232 ports through the use of port multiplexing.

Audit device 18 preferably implements software functionality that is primarily data driven. Specifically, audit device 18 preferably implements functionality directed towards collection, maintenance and delivery of data from an associated vending machine. In accordance with such a goal, audit device 18 preferably employs an information architecture model as its software architecture model.

Audit device 18 is part of a data driven solution for vending machine operators. As such, a primary objective of audit device 18 is to collect, maintain, archive and deliver data regarding the operation of a vendor or vending machine over time. Data of concern to audit device 18 may include, but is not limited to, data DEX audit data, MDB audit data, time data, audit device information, ad-hoc data, ad-hoc DEX write data, electronic lock data, Bluetooth data, encryption and security data, as well as other data.

DEX audit data may include a combination of archived DEX audit objects as well we the most current DEX audit object. A DEX audit object may include a DEX file obtained from VMC 24, a timestamp associated with the DEX file and a status field indicating the condition of the DEX interface at the time an audit attempt was made. The status field of DEX audit data will preferably include an indication as to whether the DEX interface was in a "normal" state or in a "not communicating with the VMC" state. In addition, DEX audit data may include, associated with a "not communicating with VMC" status, one or more indications as to why communications with the vending machine controller have failed. For example, indications of vending machine communication failure may include bad DEX session passwords, timing failures at the protocol level, failure of the VMC to respond after initial session inquiry or some other protocol levels.

A current DEX data object may be defined as a DEX data object generated on demand by a request from an handheld computer such as handheld computing apparatus 14. As such, a current DEX data object preferably represents the most current DEX audit object available at the time the request was generated. In a preferred embodiment, every time a current DEX object is requested and delivered to handheld computing apparatus 14, it will be added to the archived DEX collection stored in nonvolatile memory 72, for example.

An archived DEX data object may be defined as a collection of DEX data audit objects which have been collected over a period of time by audit device 18. An archived DEX data object may include any current DEX data objects collected on demand by audit device 18, such as at the request of handheld computing apparatus 14. In one embodiment, the data which makes up an archived DEX data object may be collected based on a predetermined schedule programmed on audit device 18. The data collection schedule can consist of any combination of collection frequencies, e.g., every day at eight (8) p.m. In another embodiment data collection schedule may include any number of ad-hoc schedules, e.g., Mondays at twelve (12) p.m. In another embodiment data collection schedule may include any number of ad-hoc schedules, e.g., Monday at twelve (12) p.m. and Thursday at two (2) p.m.

As mentioned above, archived DEX data is preferably stored on audit device 18 in nonvolatile memory 72. In a preferred embodiment, archived DEX data is preferably stored in a compressed format. In one embodiment, a ZLIB compression algorithm with associated dictionary may be used to minimize the amount of nonvolatile memory 72 needed to store archived data. Archived DEX data may be delivered on demand to handheld computing apparatus 14 from nonvolatile memory 72. In one embodiment, archived DEX data downloaded from audit device 18 to handheld computing apparatus 14, for example, is preferably marked as "read" so that the same data is preferably not retransmitted to the handheld computing apparatus 14 on subsequent downloads, unless specifically requested.

In the event the size of the data archives exceeds a physical memory allocation provided for it in nonvolatile memory 72, audit device 18 will preferably treat the archive as a FIFO (first-in-first-out) buffer whereby the oldest data may be removed in order to make room for new data. In a preferred embodiment, handheld computing apparatus 14 may selectively delete any single record or group of records from the archives in nonvolatile memory 72.

MDB audit data gathered by audit device 18 may include a variety of information elements which may be obtained by listening in on the MDB 26 bus using MDB-snoop serial I/O 76. For example, in MDB-snoop mode, audit device 18 may listen to communications carried on MDB data lines and VMC transmit and receive lines, and examining the contents of the data being communicated between VMC 24 and one or more MDB peripherals. For VMC's supporting the MDB Comms Gateway specification, MDB audit data may be gathered using that service.

Among the MDB audit data that may be gathered by audit device 18 includes current peripheral status information. Current peripheral status information may be defined as data referring to the operational status of one or more peripherals installed on MDB 26 of vending machine 12. Examples of peripherals operable to connect to a vending machine's multi-drop-bus include, but are not limited to, bill validators, coin mechanisms, card readers, etc.

Peripheral status may be determined by using an MDB-snoop mode which examines the history of the responses by the peripherals to a poll command routinely sent to them by, for example, VMC 24 on MDB 26. Typically, a peripheral will respond with a "normal" status response. In the event of a problem with a peripheral, the peripheral may respond with one of many different error codes. In some embodiments, MDB peripherals may respond to polling by transmitting a detailed error code only once, with subsequent responses to the polling status command being a generic "peripheral disabled" response. Therefore, it is preferred that audit device 18 track not only the current response of a peripheral to the poll command, but to also record the detailed error code and timestamp associated with the original error event.

In addition to data regarding a current MDB peripheral status, audit device 18 preferably also maintains a MDB peripheral status archive. A MDB peripheral status history according to teachings of the present invention may include all MDB peripheral status events having been recorded by listening in on MDB 26 by audit device 18. A MDB peripheral status change history may include a series of timestamped change events. By recording a timestamp, a peripheral ID, e.g., the type of peripheral as defined in an MDB/ICB specification, and a status change reflected in a device response to a VMC poll command, it is possible to construct a substantially complete history of the status events having occurred for one or more MDB devices or vending machine 12 itself. In a preferred embodiment, a MDB peripheral status change history is preferably archived in nonvolatile memory 72 and may be transmitted on demand to handheld computing apparatus 14. Using software 42 or other functionality included therein, handheld computing apparatus 14 may then analyze the MDB peripheral change history as required or requested.

In addition to data regarding peripheral status and peripheral status changes, among MDB audit data preferably archived by audit device 18, is one or more aspects of vending machine 12 sales transaction history. In one embodiment, sales transaction history data may include a series of timestamped sales transactions representing a substantially complete set of successful and/or aborted vends at vending machine 12. Similar to the data regarding MDB peripherals, one or more aspects of sales transaction history data may be tracked using MDB-snoop serial I/O 76. As with other MDB data gathered by audit device 18, sales transaction history data may be transmitted on demand to handheld computing apparatus 14. As mentioned above, data downloaded from audit device 18 to handheld computing apparatus 14 may be marked as "read" such that "read" data is not sent to handheld computing apparatus 14 on subsequent downloads unless specifically requested. Also similar to that described above, sales transaction data may be maintained by nonvolatile memory 72 in a FIFO buffer.

In one embodiment of tracking sales transaction history data, audit device 18 is preferably operable to monitor transactions on MDB 26 to determine when a successful vend has occurred. Audit device 18 will preferably store a timestamp, sales value and identify the peripherals providing the credit. In addition, audit device 18 may include among its sales transactions history data collected recordation of "exact change" aborted vends. "Exact change" aborted vends are those vends that may be aborted by VMC 24 due to an exact change condition at vending machine 12. For example, bill validator 96 transaction which was rejected by VMC 24 because there was no change available in coin mechanism 98 to proceed with the vend, is one embodiment of an "exact change" aborted vend. "Exact change" aborted vends may be identified by noting, for example, when bill validator 96 places a cash escrow value on VMC 24 in response to a VMC poll command and a VMC command that bill validator 96 return the bill using the escrow command.

As mentioned above, audit device 18 preferably includes an internal clock. The internal clock of audit device 18 is preferably synchronized to GMT date and time. The time on audit device 18 is preferably synchronized with a GMT date and time available on handheld computing apparatus 14 each time handheld computing apparatus 14 interfaces with audit device 18. In a preferred embodiment, handheld computing apparatus 14 is preferably operable to read the date and time on audit device 18 on demand in order to validate the time. This time may be used to date and timestamp all recorded events such as DEX data audit objects, MDB audit events, sales transactions, vending machine 12 error conditions, etc.

Additional data preferably maintained by audit device 18 includes audit device data. Among the audit device data preferably obtained and maintained by audit device 18 are asset data, configuration data, general event data, handheld transaction log data, as well as other data.

In one embodiment, audit device 18 will preferably maintain asset data associated with the vending machine 12. The asset data maintained by audit device 18 may be maintained in order to support field management of vending machine 12. Asset data preferably maintained by audit device 18 includes, but is not limited to, an audit device serial number, a model number, hardware revision number, manufacture date, and firmware revision number and date.

Audit device 18 may also maintain a set of internal configuration parameters required for the operation of vending machine 12 in its configuration data collection. Among the configuration parameters preferably maintained by audit device 18 and its configuration data collection, are a DEX audit schedule, DEX interface parameters, e.g., packet timeout, character timeout, VMC type detection mode, VMC type list, etc., and MDB audit event trigger table, etc.

A configuration parameter preferably managed by handheld computing apparatus 14 is an "installed" flag. Installed flag parameter is preferably Boolean and may define the operating mode of audit device 18. If the installed flag is set to false, audit device 18 may turn off all link level (Bluetooth) and application level security functions in order to allow handheld computing apparatus 14 to connect to audit device 18 and perform one or more setup or configuration operations. Once the installed flag is set to true, all link level and application level security functions are preferably activated and only an authenticated and/or authorized handheld computing apparatus 14 may be allowed access to audit device 18 thereafter. Thus, a Bluetooth PIN is preferably required for link level handshaking and an access certificate is required for application level interaction. Furthermore, once the flag is set to true, it may be set to false via a hard reset of the unit or an authenticated command using a valid access certificate, in a preferred embodiment.

In addition to an installed flag, configuration data maintained by audit device 18 preferably includes a "has DEX port" flag. The "has DEX port flag" maintained in the configuration data of audit device 18 is preferably operable to specify whether to indicate a VMC 24 read failure to the user via one or more LEDs, such as those included in user interface 90 of audit device 18. If the "has DEX port" flag is set to true, then a DEX read failure is preferably indicated on a LED of user interface 90. If the "has DEX port" flag is set to false, audit device 18 will preferably make no attempts to read DEX data from VMC 24, for example.

A "lock installed" flag is also preferably included in configuration data maintained by audit device 18. The "lock installed" flag preferably specifies whether or not an electronic lock is physically installed in vending machine 12 and associated with audit device 18. If an electronic lock 32 is not physically present, no attempts may be made to unlock an electronic lock in response to a request from handheld computing apparatus 14. Furthermore, the "lock installed" flag preferably causes an electronic lock LED on audit device 18, such as an LED included in user interface 90, to indicate that no lock is present rather than a failure to detect a lock.

Also preferably included in the audit device data maintained by audit device 18 are one or more aspects regarding general events occurring with audit device 18 or in association with vending machine 12. In a preferred embodiment, audit device 18 will preferably timestamp general events which occur at the unit. General events include, but are not limited to, power on and off events, firmware upgrade events, etc. As with other information downloaded to handheld computing apparatus 14, records associated therewith may be marked as read such that retransmission does not occur without specific request, and such information may be maintained in a FIFO manner as described above.

Audit device 18 preferably also maintains a handheld transaction log. Audit device 18 is preferably operable to maintain a log of transactions conducted between audit device 18 and/or vending machine 12 with handheld computing apparatus 14. Additional information regarding communications between vending machine 12, audit device 18 and handheld computing apparatus 14 may be maintained in a handheld transaction log by audit device 18.

As mentioned above, audit device 18 is preferably further operable to maintains such as in nonvolatile memory 72 ad-hoc data. In a preferred embodiment, handheld apparatus 14 may be operable to manage space allocation in nonvolatile memory 72 available for ad-hoc data. Ad-hoc data storage space may be used for, amongst other things, storage of a data structure (e.g., XML) containing information such as vending machine asset information, space-to-sales information, selection and SKU information, etc.

Audit device 18, in a preferred embodiment, will preferably implement at least two mechanisms for performing DEX writes to VMC 24. In a preferred embodiment, the DEX writes managed by audit device 18 are those DEX writes required to perform basic DEX extraction from VMC 24, e.g., DEX password writing and DEX error clearing. In addition, however, audit device 18 will preferably also provide a pass-through mode allowing handheld computing apparatus 14 to establish a direct communication session with VMC 24. In this mode, handheld computing apparatus 14 is preferably operable to engage in various types of DEX sessions directly with VMC 24. This includes DEX writes and reads.

Additional data, preferably maintained by audit device 18 includes electronic lock data. For example, audit device 18 will preferably maintain a log of electronic lock access events. Information that may be associated with electronic lock data maintained by audit device 18 includes, but is not limited to, a unique ID of an employee utilizing a handheld computing apparatus 14 during a communication session with audit device 18, a unique ID associated with handheld computing apparatus 14 used in communication with audit device 18, date and timestamp information associated with electronic lock interaction, a log indicating the results of lock open and close commands provided by a handheld computing apparatus 14, e.g., if an incorrect lock ID was provided and the lock open attempt fails.

Also preferably included in the electronic lock data maintained by audit device 18 is an electronic lock access key. In one embodiment, an electronic lock access key may be defined as a unique code for the installed electronic lock. Further, the electronic lock access key may be a unique key that preprogrammed into addressable switch 86 and associated with electronic lock 32. The electronic lock access key may be obtained through direct interrogation of electronic lock 32 using, for example, a one wire data protocol associated with addressable switch 86.

Audit device 18 preferably also maintains one or more components of Bluetooth data. Examples of Bluetooth data preferably maintained by audit device 18, include but are not limited to, a Bluetooth MAC (media access control) address and a Bluetooth device name.

In general, every Bluetooth transceiver is programmed with a globally unique six-byte MAC address. The MAC address of a Bluetooth transceiver may be obtained from the Bluetooth transceiver through an appropriate Bluetooth protocol stack API (application program interface) command. In a preferred embodiment, the MAC address of transceiver 52 on audit device 18 shall be made available on demand to handheld computing apparatus 14.

Similar to the Bluetooth MAC address, in general, every Bluetooth device has the ability to maintain a canonical name. Typically, this name may be assigned by application software. In one embodiment, the Bluetooth name associated with audit device 18 may be the unique asset ID of the vendor or vending machine 12 in which it is installed. An outlet ID may be obtained automatically by audit device 18 from DEX data obtained from VMC 24. A Bluetooth device name may be set to the asset ID of an associated vending machine 12 using an appropriate Bluetooth protocol stack API call. If an asset ID is not available from VMC 24 or DEX data associated with VMC 24, audit device 18 may default to the device's unique manufacturing serial number prefixed by the characters "HIAD" as its Bluetooth name. If such a value is not available, audit device 18 may use the Bluetooth MAC access prefixed by the characters "HIAD".

The Bluetooth communications interface on audit device 18 will preferably be secured using a built in Bluetooth security scheme employing a sixteen-byte PIN as well as derived link and encryption keys. Audit device 18 firmware or software is preferably responsible for providing the PIN to the Bluetooth stack used in the implementation. Additional detail regarding the security model preferably implemented by audit device 18 will be discussed in greater detail below.

In addition to the data mentioned above, audit device 18 is preferably further operable to maintain one or more encryption keys and other security data. Audit device 18 is preferably operable to securely maintain a set of one hundred twenty-eight (128) byte encryption keys to be used for authentication of digital signatures and the encryption of sensitive data using an AES (Advanced Encryption Standard) algorithm. AES encryption keys are preferably stored securely within audit device 18 to prevent them from being discerned through direct probing of vending machine hardware by unauthorized third parties. In one embodiment, a secure microprocessor or EEPROM may be provided to securely store the keys.

In addition to the AES encryption keys, audit device 18 will preferably maintain a domain hierarchy stored in nonvolatile memory 72. Domain hierarchy preferably defines a trust hierarchy to be used to authenticate a handheld computing apparatus 14 attempting to communicate with audit device 18 as well as to enforce security policies tied to audit device 18 business logic.

A variety of security keys are preferably maintained by audit device 18. In one aspect, audit device 18 will preferably maintain an AES encryption key that is unique to a particular audit device 18 and logically tied to its serial number. The agent AES key may be loaded at manufacture using a secure process. In addition, audit device 18 may maintain one or more "global" root domain AES keys. These encryption keys may be used to encrypt/decrypt data sent/received to and from a handheld computing apparatus 14. Root domain keys may be loaded at manufacture using a secure process.

Audit device 18 may also maintain a PKI (public key infrastructure) key pair in nonvolatile memory 72. The PKI key pair may be generated dynamically by software on audit device 18, software 42 on handheld computing apparatus 14 or at manufacture using a secure process. Further, audit device 18 may maintain a PKI public key for the host application in non volatile memory 72. PKI public key size is preferably at least one thousand and twenty-four (1,024) bits.

As mentioned above, audit device 18 preferably maintains a domain hierarchy in nonvolatile memory 72. The domain hierarchy preferably maintained by audit device 18 may consist of one or more domain names and their hierarchical relationship. The domain hierarchy is preferably provided to audit device 18 by a handheld computing apparatus 14 after installation using a secure process. A Domain hierarchy provided by handheld computing apparatus 14 is preferably digitally signed by the host using its PKI secret key and validated by agent software using a host PKI public key.

In one embodiment, the estimated total amount of nonvolatile memory 72 required to store the data objects described above is approximately four hundred kilobytes (400 kb). This estimate includes a fifty percent (50%) safety factor and does not include ad-hoc data objects, but assumes that audit data represents sixty (60) days of vendor or vending machine 12 activity and that a DEX object is created and archived four (4) times per day. In one embodiment, nonvolatile memory 72 storage of approximately one hundred forty kilobytes (140 kb), plus a fifty percent (50%) safety factor is included to provide for the maintenance of firmware or software associated with audit device 18. In such an embodiment, the amount of data storage for ad-hoc data may be allocated based on the amount of nonvolatile memory 72 storage available after nonvolatile memory 72 chips are selected.

As mentioned above, handheld computing apparatus 14 preferably cooperates with audit device 18 and vending machine 12 to create a PAN architecture. In one embodiment, audit device 18 preferably acts as a slave node on the PAN while handheld computing apparatus 14 may act as a Bluetooth master.

In a preferred embodiment, audit device 18 will preferably support Bluetooth device inquiry. In such an embodiment, audit device 18 will preferably make its presence known on the PAN to any Bluetooth capable device that inquires as to its presence. The inquiry process, preferably, will provide the MAC address and Bluetooth device name of audit device 18 to an inquiring device. Although audit device 18 may be discovered via inquiry, the ability to connect to audit device 18 is preferably restricted by implementing both the link level security, as well as application level security.

Despite making its presence known, audit device 18 will preferably not make its services discoverable to a connected device. By limiting discovery of audit device 18 services, PAN security is improved by obscuring entry points into audit device 18 to unauthorized third parties.

As mentioned above, audit device 18 will preferably implement two layers of security. One layer of security is preferably implemented at the application level while the other level player of security is preferably implemented at the communication link level using Bluetooth security.

Regarding link level security, audit device 18 will preferably implement one or more of the security features available via the Bluetooth protocol stack. Specifically, audit device 18 will preferably make use of the device authentication, service authentication, and data encryption capabilities found in Bluetooth. Bluetooth security facilities generally provide link level security to insure that only authenticated Bluetooth devices are able to connect to audit device 18, only authenticated Bluetooth devices with appropriate privileges are granted access to services provided by audit device 18 and information communicated between the authenticated device and audit device 18 is performed over a secure encrypted channel that cannot be monitored by a third party.

In addition to link level security, audit device 18 will preferably implement a second layer of security at the application level. Application level security will preferably provide encryption of sensitive data pay loads using the AES encryption keys described above, as well as authentication using digital certificates based on a PKI infrastructure.

For increased security, key management is preferably invisible to users and will be enabled to occur automatically during normal communication sessions. For example, if a particular link level Bluetooth key is compromised, handheld computing apparatus 14 is preferably programmed to perform key changes or alterations on all vending machines it may come in contact with. Fundamentally, key management may be performed by a handheld computing apparatus 14 and/or host application services provider 16. However, audit device 18 will preferably implement a proper authentication and screening process to insure that a handheld computing apparatus 14 attempting to modify a security key is a valid and authenticated handheld computing apparatus 14.

Regarding FIGS. 3 through 5, as well as the discussion below, a plurality of use cases preferably implementable with audit device 18 of the present invention are disclosed. Additional use cases and market requirements may be implemented or effected without departing from the spirit and scope of the present invention.

Figure 3:
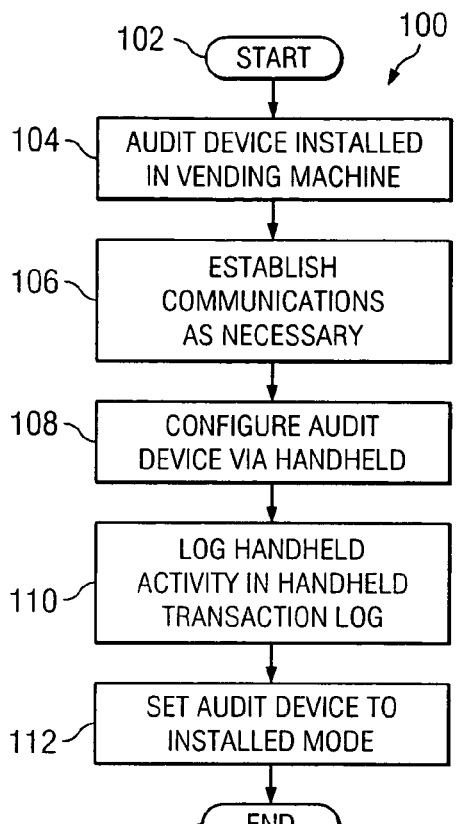
FIG. 3 is a flow diagram illustrating one embodiment of a method for installing and configuring a vending machine audit device according to teachings of the present invention.

Referring first to FIG. 3, a flow diagram depicting one embodiment of installing and configuring an audit device in a vending machine is shown. According to teachings of the present invention, installation of audit device 18 on vending machine 12 may occur in the field or in a manufacturer's facility. In accordance with teachings of the present invention, method 100 preferably includes the presence of a handheld computing apparatus 14 with software 42 operable to configure audit device 18.

Upon beginning at 102, method 100 preferably proceeds to 104 where audit device 18 may be installed in vending machine 12. In detail, audit device 18 is preferably physically mounted inside vending machine 12. Power to vending machine 12 or to a door (not expressly shown) of vending machine 12 is then preferably removed. A DEX harness of audit device 18 may then be inserted into a DEX port of VMC 24. A MDB harness of audit device 18 may then be attached to MDB 26. In addition, audit device 18 is preferably coupled to electronic lock 32. In addition, any expansion peripherals are preferably connected to a vending machine 12 expansion bus.

Following installation and coupling of desired hardware, a user may then depress and hold a reset button operable to restore power to the vendor door or vending machine 12 itself. Restoration of power preferably causes power to flow through MDB 26 and thereby powers audit device 18. In an alternate embodiment, a handheld computing apparatus 14 may be connected directly to audit device 18 using ESD protected RS-232 serial I/O port 56 and corresponding RS-232 serial I/O port 58 on handheld computing apparatus 14. When coupled over respective RS-232 ports, audit device 18 may audit the entire installation process. Audit device 18 preferably presents detailed system diagnostics and provides for low level configuration control using a handheld computing apparatus 14 interface.

At power up, audit device 18 will preferably perform one or more self diagnostic operations. If a self diagnostic operation fails, e.g., a memory parity error, audit device 18 will preferably communicate such a failure via one or more aspects of user interface 90, such as one or more light emitting diodes. If a problem is encountered, the user may attempt to diagnose the issue with handheld computing apparatus 14, e.g., by downloading new firmware, a soft reset of the unit, a hard reset of the unit, etc.

Following successful boot of audit device 18 and vending machine 12 at 104, method 100 preferably proceeds to 106, where audit device 18 and vending machine 12 communication may be established as necessary. As mentioned above, vending machine 12 and audit device 18 communications may occur over a PAN, DEX interface, MDB interface, electronic lock interface as well as over an expansion bus interface.

Audit device 18 is preferably configured to set up a DEX interface on vending machine 12. Audit device 18 may set up its DEX interface as necessary to manage DEX passwords, VMC 24 type detection, etc.

Audit device 18 preferably initializes the PAN interface as necessary. In a case of a Bluetooth PAN, initialization may include installation and configuration of a Bluetooth hardware module. In one embodiment, audit device 18 may set its Bluetooth name to an audit device manufacturing serial number prefixed by the characters "HIAD". During the installation process, handheld computing apparatus 14 may be used to set a register on audit device 18 which contains the Bluetooth name to use after installation has been completed. In one embodiment, this Bluetooth name change may be the customer assigned asset I.D. of vending machine 12. If using Bluetooth between vending machine 12 and handheld computing apparatus 14, a communication session with audit device 18 may be established by handheld computing apparatus 14 such that the installation process may be audited and managed.

Audit device 18 is preferably further configured to set up an MDB interface as necessary to snoop on MDB 26. Setup of a MDB interface may include registering the device on MDB 26 as a MDB Comms module per the MDB/ICP specification and/or the EVS specification.

Audit device 18 preferably establishes an electronic lock interface, as mentioned above. In doing so, audit device 18 preferably inspects vending machine 12 via its electronic lock interface for the presence of an electronic lock 32. If an electronic lock 32 is detected, the unique address of the electronic lock is preferably acquired and stored for use.

As mentioned above, user interface 90 of audit device 18 preferably includes one or more LEDs operable to provide visual feedback on the status of various components of audit device 18 or vending machine 12. As it relates to the establishment of communications for audit device 18 and/or vending machine 12, one or more LEDs of user interface 90 may be employed to provide visual feedback on the status of the personal area network, DEX, MDB, expansion bus and electronic interface setup procedures. If a problem is detected by observing the LEDs of user interface 90, or through inspection of diagnostic data presented by handheld computing apparatus 14, a user may attempt to correct errors through manipulation of configuration parameters on audit device 18 via handheld computing apparatus 14.

One the required or desired communications capabilities for audit device 18, vending machine 12 and handheld computing apparatus 14 have been established at 106, method 100 preferably proceeds to 108, where handheld computing apparatus 14 may be used to establish basic configuration parameters of audit device 18. Setup of the basic configuration parameters of audit device 18 may begin with an initial handshake concerning the Bluetooth PAN, between audit device 18 and handheld computing apparatus 14. When audit device 18 is in an uninstalled mode, i.e., its install flag is set to false, handheld computing apparatus 14 may be allowed full access to audit device 18 at both the link level and application level. Once a configuration session has been established, audit device 18 preferably proceeds to automatically synchronize its internal clock with a clock on handheld computing apparatus 14. Such routine synchronization preferably provides audit device 18 with a reliable reference standard for which to run its internal real-time-clock.

Having synchronized clocks between audit device 18 and handheld computing apparatus 14, handheld computing apparatus 14 may then access one or more applications, such as via software 42, available on handheld computing apparatus 14 to program a variety of basic configuration parameters and POC parameters on audit device 18. For example, configuration of DEX audit data collection schedules and updates to an MDB data trigger table may be established via handheld computing apparatus 14. In addition, handheld computing apparatus 14 may be used to set vendor asset, selection and S2S data on VMC 24. Further, handheld computing apparatus 14 may be employed to store ad-hoc data provided by handheld computing apparatus 14 on audit device 18, to configure one or more PAN parameters, to set the "lock installed" flag and to set the "has DEX port" flag.

In a preferred embodiment, handheld computing apparatus 14 and its associated software 42 preferably guide a user through one or more security setup requirements. In one embodiment, handheld computing apparatus 14 guides a user to set the asset I.D. associated with vending machine 12. The asset I.D. value may be used to define the Bluetooth name of audit device 18 once the configuration process has completed. Handheld computing apparatus 14 may also be employed to define the route number and outlet I.D. of vending machine 12. In a preferred embodiment, handheld computing apparatus 14 is configured to push this data to audit device 18 together with a domain hierarchy initially provided by a host application.

Following completion of one or more handheld computing apparatus 14 operations, or concurrent with the performance of one or more handheld computing apparatus 14 operations, a handheld transaction log is preferably maintained. At 110, audit device 18 preferably logs all handheld computing apparatus 14 activity between audit device 18 and itself in a handheld transaction log. As mentioned above, a handheld transaction log may be maintained in nonvolatile memory 72 on audit device 18.

Once all configuration parameters are set, the handheld transaction log updated, audit device 18 is preferably set to an installed mode. To effect an installed mode, handheld computing apparatus 14 preferably commands audit device 18 to set its installed flag to true. By setting the installed flag to true in audit device 18, all application level security functions preferably become active. Following the setting of audit device 18 to installed mode at 112, method 100 preferably ends at 114.

Once audit device 18 has been installed, configured and placed in the field with a live vending machine 12, audit device 18 preferably performs in a steady state operation. In its steady state operation, audit device 18 will preferably perform automatic collection of DEX, MDB and electronic lock access audit data as defined by a DEX audit schedule, a MDB event triggers programmed during installation and electronic lock access events occurring from time to time.

For example, audit device 18 preferably follows a predefined data collection configuration including collecting DEX at a given frequency (daily, weekly, etc.) at a certain time of day or on specified days of the week and at a specified time of day. Further, audit device 18 preferably collects MDB data based on user defined triggers such as a change in a peripheral's status, successful sales transactions, aborted sales transactions, etc. In addition, audit device 18 preferably collects electronic lock access information whenever audit device 18 receives a command from a handheld computing apparatus 14 to access electronic lock 32. If the information is available, audit device 18 may also log the success or failure of an electronic lock 32 access attempt. Preferably, as data is collected by audit device 18, it is timestamped for storage/archiving in nonvolatile memory 72.

If a power outage occurs at vending machine 12, audit device 18 is preferably operable to maintain its real-time-clock for at least three months. In the event the power outage lasts longer than three months, when audit device 18 and vending machine 12 are repowered, audit device 18 will preferably begin timestamping, using time established at boot-up. In a preferred embodiment, handheld computing apparatus 14 software may later attempt to deduce an actual date and/or time of power failure, restoration, etc.

Figure 4:
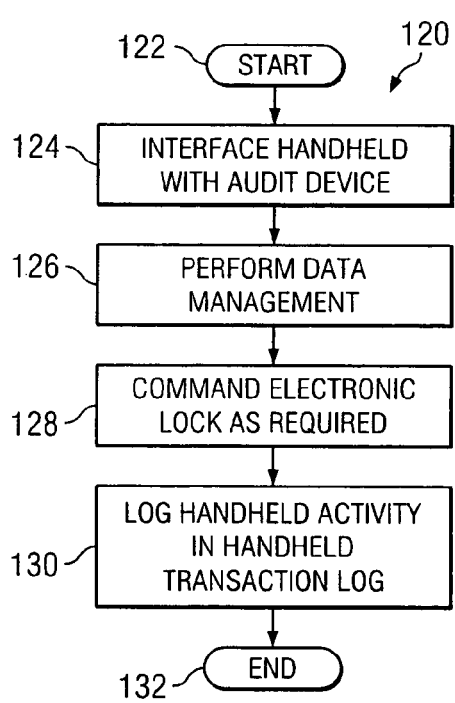
FIG. 4 is a flow diagram illustrating one embodiment of a vending machine audit method according to teachings of the present invention.
Figure 5:
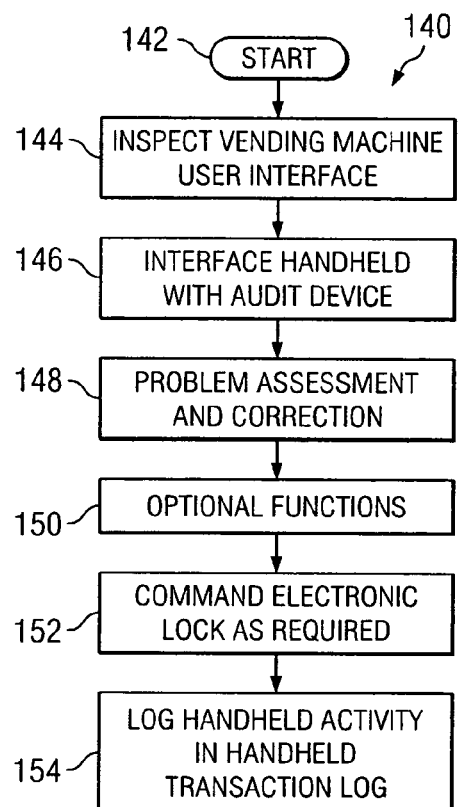
FIG. 5 is a flow diagram illustrating one embodiment of a vending machine service method according to teachings of the present invention.

Referring now to FIG. 4, one embodiment of a method for auditing a vending machine 12 including an audit device 18 using handheld computing apparatus 14 is shown generally at 120. In general, a route driver may visit one or more vending machines 12 with some frequency in order to deliver product and collect monies. Every time a driver visits a vending machine 12, the driver preferably uses their handheld computing apparatus 14 to download audit information from audit device 18, download cashless transaction data from cashless reader 30, upload any data needing to be updated on audit device 18, the vending machine 12 itself, or any peripherals that may be attached via an expansion bus. Furthermore, a route driver may visit a vending machine 12 to upgrade firmware or one or more security keys on audit device 18. Following interaction with vending machine 12 and audit device 18, the route driver will preferably interface their handheld computing apparatus 14 with host application service provider 16 such that the information collected by the handheld computing apparatus 14 may be downloaded to the host application service provider 16. Similarly, information needing to be pushed from host application service provider 16 to audit device 18 and/or any attached peripherals may be stored on handheld computing apparatus 14 for later communication at this time.

Upon initiation at 122, method 120 preferably proceeds to 124, where a handheld computing apparatus 14 may be interfaced with audit device 18 at a vending site. To interface handheld computing apparatus 14 with audit device 18, audit device 18 and handheld computing apparatus 14 must generally perform a handshake in order to discover each other at the Bluetooth link level. This handshake generally requires that Bluetooth PINS on both audit device 18 and handheld computing apparatus 14 match. If there is a match between Bluetooth PINS, a secure Bluetooth session may be established.

Once a Bluetooth session is established, handheld computing apparatus 14 will preferably present an access certificate to audit device 18. Audit device 18 will then preferably validate the certificate. If certificate validation fails, handheld computing apparatus 14 is denied access to audit device 18.

Once a Bluetooth session is established, audit device 18 preferably proceeds to synchronize its internal clock with a clock on handheld computing apparatus 14. As mentioned above, this routine synchronization preferably provides audit device 18 with a reliable reference standard for which to run its real-time-clock off of.

After interfacing handheld computing apparatus 14 with audit device 18 at 124, method 120 preferably proceeds to 126. At 126, handheld computing apparatus 14 may perform one or more data management operations. In one embodiment, software 42 on handheld computing apparatus 14 preferably drives data management steps at each vending machine 12 stop.

From the perspective of audit device 18, the specific work flow being implemented and requested by handheld computing apparatus 14 is preferably invisible. In effect, audit device 18 responds to commands it receives from handheld computing apparatus 14 in whatever order it receives them. Audit device 18 preferably supports a variety of commands, such as those described in the information architecture presented above. For example, handheld computing apparatus 14 may command audit device 18 to deliver all archived audit data as well as current DEX and MDB peripheral status data. In one embodiment, to get current DEX data, audit device 18 preferably actively polls VMC 24. Audit device 18 may then create a current DEX audit object and transmit the same to handheld computing apparatus 14. Alternatively, handheld computing apparatus 14 may request a DEX pass-through session and perform its own DEX data extraction.

In one embodiment, teachings of the present invention permit handheld computing apparatus 14 and audit device 18 to cooperate to calculate a change in state or delta of vending machine 12 at 126. To calculate a delta, handheld computing apparatus 14 preferably obtains a vending machine status reference image from an ad-hoc portion of memory 28 on audit device 18. The vending machine status reference image may be in the form of a DEX and/or MDB file captured by audit device 18 for storage after some specified event; e.g., in response to the restocking and other maintenance of a selected vending machine, according to a defined vending machine state image capture schedule, etc. The reference image may include many variables that can be monitored from DEX interface 22 and/or MDB interface 26 including, but not limited to, product inventories, currency inventories, vend counts, aborted vend counts and exact change errors.

To calculate a vending machine state or status delta, handheld computing apparatus 14 may also request that audit device capture a current vending machine status image. The current vending machine status image will preferably include the same or similar variables as that contained in the vending machine state reference image stored in memory 28 however, the current vending machine status image will preferably include values for such variables as measured at a substantially current time. Having both the vending machine state reference image and the current vending machine state image, handheld computing apparatus 14 may identify a delta or change in state or status of the selected vending machine as measured from the time of the reference image and the time of the current image. The delta calculation may provide a vending machine route driver with the most current vending machine data possible as the delta may be calculated real-time from data updated to the instance of measure.

Additional tasks which may be commanded of audit device 18 by handheld computing apparatus 14 at 126 of method 120 include, but are not limited to, configuring a DEX audit data collection schedule and updating a MDB trigger table, setting vendor asset selection and S2S data on VMC 24 using a DEX pass-through operation, storing ad-hoc data to audit device 18, performing a soft reboot of audit device 18 in an attempt to resolve one or more audit device 18 errors, and downloading cashless transactions from cashless media device or reader 30.

As described above, audit device 18 preferably preserves all audit data after it has been downloaded to handheld computing apparatus 14. The downloaded data is preferably marked "read" but is not deleted from nonvolatile memory 72. As the size of the audit archives increases, the oldest data is preferably overwritten with newer data, i.e., in a first in first out (FIFO) manner. During subsequent visits, only unread or undelivered data is preferably downloaded to handheld computing apparatus 14. However, handheld computing apparatus 14 may make a specific request that all data maintained by audit device 18 be downloaded. By enabling the download of only the most recent data, file transfer time from audit device 18 to handheld computing apparatus 14 may be minimized. Handheld computing apparatus 14 may request records from audit device 18 regardless of their delivered status using an ad-hoc transaction record query mechanism.

At 128, a user may instruct audit device 18 to operate electronic lock 32. If needed, a route driver, via handheld computing apparatus 14, may command audit device 18 to engage or disengage electronic lock 32 by sending a door open command. Audit device 18 may disengage electronic lock 32, for example, by energizing electronic lock 32 for an arbitrary time period, such as ten (10) seconds. Electronic lock 32 may be configured to automatically engage once audit device 18 ceases energizing it. As mentioned above, all electronic lock access activity is preferably logged by audit device 18.

At 130 of method 120, audit device 18 preferably logs all handheld activity in a handheld transaction log. As mentioned above, activity that may be logged in a handheld transaction log maintained by audit device 18 includes, but is not limited to, handheld computing apparatus 14 electronic lock commands, download history, and audit device 18 upgrades or configuration and settings changes. Method 120 the preferably ends at 132.

As service problems are reported by customers, route drivers or host application service provider 16 itself, a service technician may be sent to a vending site from time to time for repairs. Referring to FIG. 5, a flow diagram illustrating one embodiment enabling the provision of repair services on vending machine 12 and/or audit device 18 is shown.

As indicated generally in method 140, a service technician may arrive at a vending site and, based on the type of problem reported, attempt to diagnose problems at one or more vending machines 12. The service technician will preferably maintain a handheld computing apparatus 14 allowing the technician to communicate with an audit device 18 for purposes including inspecting the operational status of MDB peripherals, VMC 24, audit device 18, as well as other devices. The technician's handheld computing apparatus 14 may also be employed in an attempt to correct any problems encountered. In other cases, a service technician may be called upon to modify one or more configuration parameters of vending machine 12, audit device 18, or any peripheral attached to one or more audit device 18 expansion ports.

Upon beginning at 142, method 140 preferably proceeds to 144, where the inspection of vending machine user interface may be effected. In preferred embodiment, a service technician visiting a reported problem vending machine 12 site, will first inspect the status of one or more LEDs on user interface 90 of audit device 18 in an attempt to ascertain whether or not there is a reported problem. If user interface 90 displays a problem condition, the visiting service technician may take appropriate action to resolve the problem presented. Resolution of the problem may require recabling or checking cabling in vending machine 12. Resolution may also suggest a reboot of audit device 18 and/or vending machine 12 by power cycling it, resetting all cables, etc. In addition, handheld computing apparatus 14 may be employed to diagnose audit device 18 and/or vending machine 12 errors.

In order to employ handheld computing apparatus 14 to diagnose audit device 18 and/or vending machine 12 errors, handheld computing apparatus 14 must be interfaced with audit device 18 at 146 of method 140. Handheld computing apparatus 14 may be interfaced with audit device 18 and/or vending machine 12 using a wired or direct wireline connection over RS-232 serial I/O ports 56 and 58, or wirelessly via a Bluetooth PAN. Establishment of communications between handheld computing apparatus 14 and audit device 18 and/or vending machine 12 may occur as generally defined above with respect to FIGS. 3 and 4 illustrating methods 100 and 120, respectively.

Once a communication interface between handheld computing apparatus 14 and audit device 18 and/or vending machine 12 has been established at 146, method 140 preferably proceeds to 148 where problem assessment and correction may begin. In one embodiment, handheld computing apparatus 14 preferably generates prompts as to possible actions that may be taken at this point. From handheld computing apparatus 14, operational status reports for VMC 24, one or more of the MDB peripherals, or audit device 18 itself may be viewed. In one embodiment, details of problem resolution via handheld computing apparatus 14 may be managed by software 42 included thereon.

For example, software 42 on handheld computing apparatus 14 may command audit device 18 to deliver all DEX, MDB and electronic lock access audit data. In addition, audit device 18 may be commanded to deliver general events, vendor information and audit device asset data to handheld computing apparatus 14. In order to not interfere with normal audit data collection processes, the DEX and MDB audit data downloaded in a service mode is preferably not marked "read", as indicated in prior cases.

In an effort to assess errors at vending machine 12 or audit device 18, MDB audit data may be analyzed to determine the status of MDB peripherals as well as their status history. In addition, general events data may be analyzed to determine if any internal error conditions have been logged and to determine the power cycle history of vending machine 12 and/or audit device 18. DEX data may be examined and its configurations compared with those stored in a vendor information data object. If a DEX audit operation is unable to download a DEX data file, this is noted by software 42. After data analysis has completed, handheld computing apparatus 14 preferably presents results of the analysis via handheld computing apparatus 14. Software 42 preferably facilitates viewing of a summary of the results as well as the ability to drill down on the history of, for example, an MDB peripheral's status over time.

At this point, action may be taken to correct one or more audit device 18 or vending machine 12 errors. Steps to correction may be suggested by software 42 of handheld computing apparatus 14 as well as by training of the service technician. Steps that may be suggested by software 42 of handheld computing apparatus 14 include, but are not limited to, reconfiguring audit device 18 and/or VMC 24, performing a soft or hard reboot of audit device 18, and uploading new firmware to audit device 18.

Following audit device 18 and/or vending machine problem assessment and correction at 148, method 140 preferably proceeds to 150. At 150, optional functions may be performed. Additional optional functions that may be carried out at 150 include, but are not limited to, viewing a handheld transaction log and replacing an existing audit device 18 with a new audit device and performing activities associated with installation of the new audit device.

Following the performance of any desired optional functions at 150, method 140 preferably proceeds to 152. At 152, electronic lock 32 of vending machine 12 may be commanded to disengage thereby granting access to internal components of vending machine 12. Engagement and disengagement of electronic lock 32 via handheld computing apparatus 14 and audit device 18 may proceed generally as defined above. In a preferred embodiment, all electronic lock 32 access activity is preferably logged in an electronic lock access log maintained by audit device 18. At 154, similar to that described above, audit device 18 preferably logs all activity occurring between itself and handheld computing apparatus 14 in a handheld transaction log. Method 140 may then end at 156.

As mentioned above, cashless media device or cashless reader 30 is preferably included in vending machine 12. Cashless media device 30 is preferably a hardware device designed to accept non-cash payment tokens at vending machine 12, e.g., credit cards, RFID devices, IrDA devices, etc. According to teachings of the present invention, audit device 18 and cashless media device 30 are preferably physically interfaced using expansion bus 92 of audit device 18. A similar connection is assumed to exist on cashless media device 30. The interface between audit device 18 and handheld computing apparatus 14 preferably provides handheld computing apparatus 14 access to data on cashless media device 30 and preferably allows handheld computing apparatus 14 to execute commands on cashless media device 30. Such cashless media device 30 capabilities may be provided by audit device 18 using a pass-through mode to communicate with cashless media device 30 or through commands executed on audit device 18 that in turn cause audit device 18 to perform its own communication with cashless media device 30.

As mentioned above, vending machine 12 may include an expansion device 94 coupled to expansion bus 92. In one embodiment, expansion device 94 may include a WLAN or WWAN. In such an implementation, the WLAN or WWAN transceiver may act as another command and control interface point for audit device 18, not unlike a handheld computing apparatus interface between audit device 18 and handheld computing apparatus 14. Audit device 18, in such an embodiment, is preferably operable to respond to remote commands provided to it over a WLAN or WWAN communication medium. Also in a preferred embodiment, audit device 18 is operable to autoconfigure any supported WLAN or WWAN transceiver attached to it. Also in a preferred embodiment, audit device 18 is preferably operable to detect the presence of a transceiver on expansion bus 92. In addition, audit device 18 is preferably operable to identify the type of transceiver present and select an appropriate communications protocol to command and control the identified transceiver. Further, audit device 18 is preferably operable to initialize the transceiver to its appropriate settings. In addition, audit device 18 is preferably operable to detect the presence of a wireless network and report such presence via user interface 90, for example, and optionally via handheld computing apparatus 14. In the case of a WWAN transceiver, audit device 18 is preferably operable to commission itself with host application service provider 16, if not already commissioned. In the case of a WLAN transceiver, audit device 18 is preferably operable to establish a connection with a WLAN hub. Further, audit device 18 is preferably operable to detect inbound commands arriving via an expansion transceiver device 94, validate and authenticate the commands, and reply to them using an appropriate communications protocol.

Although the disclosed embodiments have been described in detail, it should be understood that various changes, substitutions and alterations can be made to the embodiments without departing from their spirit and scope. For example, reference herein is made to wireless communications across an approximately 2.4 GHz radio spectrum. In particular, reference herein is made to Bluetooth operating in the approximately 2.4 GHz radio spectrum. Other communication protocols may be employed with the present invention without departing from its spirit and scope at approximately 2.4 GHz radio spectrum as well as in different communication bands. Examples of such other wireless communication technologies that may be employed include, but are not limited to, IEEE 802.11b, IEEE 802.11g, IEEE 802.11a, Global Systems for Mobile Communications (GSM), 3GSM, Code Division Multiple Access (CDMA), and CDMA2000.

What is claimed is:

1. A vending machine comprising:
   vending hardware;
   a vending machine controller operably coupled to the vending hardware;
   an electronically controllable lock;
   an addressable switch connected to the electronically controllable lock and operable to engage or disengage the electronically controllable lock;
   an audit device having a communications interface operably coupled to the vending machine controller and in communication with the electronically controllable lock by means of the addressable switch;
   a secure application module contained within the audit device and operable to store an encryption key;
   the audit device operable to receive an unlock command from a handheld computer via the communications interface and send a predetermined signal to the addressable switch causing the addressable switch to unlock the vending machine in response to receiving the unlock command from the handheld computer, wherein the encryption key is used to authorize the unlock command received from the handheld computer;
   the audit device operable to automatically collect transaction data and to store timestamps with the transaction data to maintain an audit trail of transactions occurring at the vending machine; and
   the audit device operable to automatically collect and store electronic lock access data.

2. The vending machine of claim 1, further comprising:
   a cashless media device operable to enable a cashless vending transaction; and
   the audit device operable to permit communication of a record associated with a cashless vending transaction to the handheld computer.

3. The vending machine of claim 2, further comprising the audit device operable to initiate collection on accounts for a cashless vending transaction via transmission of the transaction records to the handheld computer followed by transmission of the cashless transaction records to at least one agency responsible on the accounts via the handheld computer.

4. The vending machine of claim 2, further comprising the audit device operable to permit direct communication between the handheld computer and the cashless media device.

5. The vending machine of claim 1, further comprising the audit trail including transactions between the handheld computer and the audit device.

6. The vending machine of claim 1, further comprising a security application module operable to effect at least one authorization verification with the handheld before permitting a handheld computer transaction.

7. The vending machine of claim 1, further comprising the audit device operable to obtain transaction data recorded by the vending machine controller for storage in an audit device memory.

8. A vending machine comprising:
- a vending machine controller operably coupled to an electronically controllable lock;
- the electronically controllable lock operable to be engaged and disengaged;
- an addressable switch connected to the electronically controllable lock and operable to engage or disengage the electronically controllable lock;
- an audit device having a communications interface operably coupled to the vending machine controller and in communication with the electronically controllable lock through the addressable switch;
- the audit device operable to receive an unlock command from a handheld computer via the communications interface and the addressable switch to disengage the electronically controllable lock and provide access to internal components of the vending machine in response to receiving the unlock command from the handheld computer;
- the audit device operable to permit communication of a record associated with a cashless vending transaction to the handheld computer;
- the audit device operable to initiate collection on accounts for a cashless vending transaction via transmission of the transaction records to the handheld computer followed by transmission of the cashless transaction records to at least one agency responsible on the accounts via the handheld computer;
- the audit device operable to maintain an audit trail of transactions occurring at the vending machine including operation of the electronically controllable lock; and
- security keys maintained by the audit device in a secure application module to effect at least one authorization verification with the handheld computer before permitting a handheld computer transaction.

9. A vending machine comprising:
- vending hardware operable to accept cash and non-cash payment tokens at the vending machine;
- the vending machine hardware including at least one inventory dispensing apparatus;
- a vending machine controller operably coupled to the vending hardware;
- an electronically controllable lock;
- an addressable switch connected to the electronically controllable lock and operable to engage or disengage the electronically controllable lock;
- an audit device having a communications interface operably coupled to the vending machine controller and in communication with the addressable switch and the electronically controllable lock, the audit device operable to receive an unlock command from a handheld computer via the communications interface and unlock the vending machine in response to receiving the unlock command from the handheld computer;
- the audit device operable to permit communication of a record associated with a cashless vending transaction to the handheld computer;
- the audit device operable to initiate collection on accounts for a cashless vending transaction via transmission of the transaction records to the handheld computer followed by transmission of the cashless transaction records to at least one agency responsible on the accounts via the handheld computer;
- the audit device operable to maintain an audit trail of transactions occurring at the vending machine including operation of the electronically controllable lock; and
- the audit device having a secure application module operable to store at least one security key and to effect at least one authorization verification with the handheld before permitting a handheld computer transaction.

* * * * *